United States Patent

Jewess et al.

(10) Patent No.: US 9,540,949 B2
(45) Date of Patent: Jan. 10, 2017

(54) TURBINE HUB RETAINER

(71) Applicant: Hamilton Sundstrand Corporation, Windsor Locks, CT (US)

(72) Inventors: Gordon F. Jewess, San Diego, CA (US); Navindaran Sirinivasan, El Cajon, CA (US); Marek Michalik, Rzeszow (PL); James J. McLaughlin, San Diego, CA (US); James C. Napier, San Diego, CA (US); Krzysztof Kowiel, Rzeszow (PL); Agata Miaskiewicz, Rzeszow (PL)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 683 days.

(21) Appl. No.: 13/713,513

(22) Filed: Dec. 13, 2012

(65) Prior Publication Data

US 2014/0165590 A1 Jun. 19, 2014

(51) Int. Cl.
*F01D 25/16* (2006.01)
*F01D 25/04* (2006.01)
*F02K 1/04* (2006.01)

(52) U.S. Cl.
CPC ............. *F01D 25/162* (2013.01); *F01D 25/04* (2013.01); *F02K 1/04* (2013.01); *F05D 2220/50* (2013.01)

(58) Field of Classification Search
CPC ....... F01D 25/162; F01D 21/04; F01D 21/045
See application file for complete search history.

(56) References Cited

U.S. PATENT DOCUMENTS

| | | | |
|---|---|---|---|
| 1,822,945 A | 9/1931 | Weis | |
| 1,919,359 A | 7/1933 | Britain | |
| 2,928,648 A | 3/1960 | Haines et al. | |
| 3,914,070 A | 10/1975 | Straniti | |
| 3,942,908 A | 3/1976 | Pilarczyk | |
| 4,240,250 A | 12/1980 | Harris | |
| 5,100,050 A | 3/1992 | Krueger et al. | |
| 5,161,950 A | 11/1992 | Krueger et al. | |
| 5,428,952 A * | 7/1995 | Jewess | F02C 7/04 60/796 |
| 6,016,600 A | 1/2000 | Kennell et al. | |
| 7,156,612 B2 | 1/2007 | Warikoo et al. | |
| 8,047,768 B2 | 11/2011 | Deodhar et al. | |
| 2004/0009060 A1 | 1/2004 | Romani et al. | |
| 2006/0053799 A1 | 3/2006 | Aycock et al. | |
| 2007/0068136 A1* | 3/2007 | Cameriano et al. | 60/200.1 |

(Continued)

FOREIGN PATENT DOCUMENTS

GB 929615 A 6/1963

OTHER PUBLICATIONS

International Searching Authority, PCT Notification of Transmittal of the International Search Report and the Written Opinion, Mar. 14, 2014, 13 pages, International Application No. PCT/US2013/072791.

(Continued)

*Primary Examiner* — Craig Kim
(74) *Attorney, Agent, or Firm* — Kinney & Lange, P.A.

(57) ABSTRACT

A retainer for a gas turbine engine includes a center body, a plurality of struts, and a ring. The plurality of struts are connected to and extend outward from the center body. The ring is connected to the plurality of struts and is positioned aft of the center body with respect to a direction of airflow through the gas turbine engine.

18 Claims, 4 Drawing Sheets

(56) References Cited

U.S. PATENT DOCUMENTS

| | | |
|---|---|---|
| 2010/0178162 A1 | 7/2010 | Deodhar et al. |
| 2010/0221115 A1* | 9/2010 | Jardine et al. ............ 416/220 R |
| 2011/0073745 A1 | 3/2011 | Duchatelle et al. |
| 2011/0308229 A1 | 12/2011 | Hagshenas |
| 2012/0020771 A1 | 1/2012 | Hollman et al. |
| 2014/0003911 A1* | 1/2014 | Alexander et al. ........ 415/121.2 |

OTHER PUBLICATIONS

Extended European Search Report for EP Application No. 13862994.4, dated Nov. 24, 2015, 8 pages.

* cited by examiner

TURBINE HUB RETAINER

BACKGROUND

The invention relates generally to turbomachinery, and more particularly to a containment structure for a gas turbine engine.

Auxiliary power units ("APUs") are gas turbine engines, and therefore, typically include multiple sections that are used to extract energy. These sections include an inlet section, a compression section, a combustor section, a turbine section, and an exhaust nozzle section. The inlet section moves air into the engine. The air is compressed in the compression section. The compressed air is mixed with fuel and is combusted in combustion areas within the combustor section. The products of the combustion expand in the turbine section to rotatably drive the engine. The products of the combustion are exhausted from the APU via an exhaust housing of the exhaust nozzle section.

It is desirable for APU manufacturers to demonstrate that the cases and other structures of the APU are able to limit damage caused by a catastrophic failure of a high energy rotor and blades. One such rotor failure can occur if the turbine hub breaks into pieces or breaks loose from a bearing capsule and compressor impeller. Such a failure can result in the turbine hub (or pieces of the turbine hub) being ejected aft through the exhaust housing of the exhaust nozzle section. Typically, a containment structure is positioned aft of the rotor in order to absorb at least some of the energy of the turbine hub (or pieces of the turbine hub) when it fails. However, to date containment structures have been susceptible to vibratory excitation and have other characteristics that can negatively impact APU performance.

SUMMARY

An embodiment includes a retainer for a gas turbine engine includes a center body, a plurality of struts, and a ring. The plurality of struts are connected to and extend outward from the center body. The ring is connected to the plurality of struts and is positioned aft (or downstream) of the center body with respect to a direction of airflow through the gas turbine engine.

A further embodiment includes a gas turbine engine with a turbine hub and a generally conically shaped retainer positioned axially aft of and spaced at a distance from turbine wheel. The retainer includes a center body, a plurality of struts, and a ring. The plurality of struts are connected to and extend outward both axially and radially (with respect to a centerline axis of the gas turbine engine) from the central hub to the ring.

An additional embodiment includes a generally conically shaped retainer for a gas turbine engine includes a center body, a plurality of struts, and a ring. The plurality of struts are shaped as rods and are connected to and extend outward from the center body. The ring is connected to outer radial ends of the struts and is positioned aft of the center body with respect to a direction of airflow through the gas turbine engine. Additionally, the ring is connected to and forms a portion of an exhaust housing of the gas turbine engine.

DETAILED DESCRIPTION

The present disclosure describes a generally conically shaped turbine hub retainer with a ring and struts that extend inward to a center body. In a gas turbine engine, the ring is positioned radially outward of and rearward of the center body and forms a portion flow path of the gas turbine engine aft of turbine hub. In one embodiment, the struts are rod shaped with a thinned diameter that reduces weight, operating losses, and the likelihood of vibratory excitation of the retainer during operation. The addition of the retainer has minimal impact on noise and weight of the gas turbine engine while affording substantial benefits including the ability of the center body to act to impede or substantially reduce the speed of aft axial movement of the turbine hub in the event of a catastrophic failure of the turbine hub.

Figure 1:
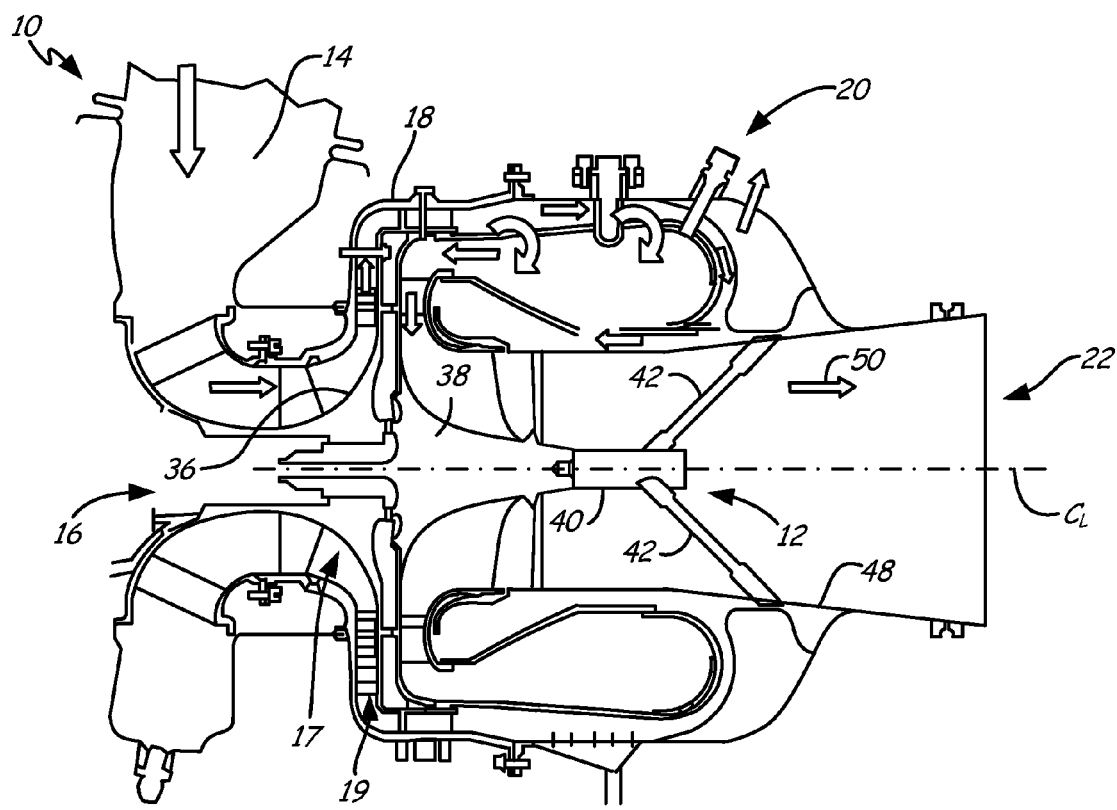
FIG. 1 is a cross-sectional view of an exemplary gas turbine engine.

FIG. 1 shows a cross-section of a gas turbine engine 10 incorporating an embodiment of a retainer 12. Gas turbine engine 10 additionally includes an inlet assembly 14, a bearing capsule 16, a rotor assembly 17, a shroud 18, a diffuser 19, a combustor assembly 20, and an exhaust nozzle assembly 22. Inlet assembly 14 includes a compressor impeller 36 and a turbine hub 38. Retainer 12 includes a center body 40 and struts 42. Exhaust nozzle assembly 22 includes an exhaust housing 48.

Gas turbine engine 10 is circumferentially positioned about an engine centerline $C_L$. Retainer 12 is positioned downstream of bearing capsule 16 and rotor assembly 17 within exhaust nozzle assembly 22. Shroud 18, diffuser 19, and combustor assembly 20 are positioned radially outward of bearing capsule 16 and rotor assembly 17.

Shroud 18 extends to surround diffuser 19 and portions of combustor assembly 20. Compressor impeller 36 is connected to turbine hub 38 of rotor assembly 17 along centerline axis $C_L$. Shroud 18 radially surrounds compressor impeller 36 and portions of turbine hub 38.

Retainer 12 is positioned axially aft of and is spaced at a distance from turbine hub 38. More particularly, center body 40 is disposed a small distance rearward of turbine hub 38 along centerline axis $C_L$. Struts 42 extend radially as well as axially aft from center body 40 to exhaust housing 48. More particularly, struts 42 extend to connect to a conically shaped ring (FIGS. 2, 3A, and 3B) that is welded or otherwise formed with exhaust housing 48. Center body 40 and struts 42 are positioned within a flow path 50 of gas turbine engine 10 aft of turbine hub 38.

During operation, air enters forward inlet 24 and is compressed by the centrifugal action of compressor impeller 36. The compressed air is directed by shroud 18, through diffuser 19, and into combustor assembly 20 where it mixes with fuel and is ignited to produce a flame. High temperature gases produced by the flame expand rapidly and propel turbine hub 38. Turbine hub 38, through its attachment to bearing capsule 16, drives compressor impeller 36 and any additional systems attached to bearing capsule 16.

Should turbine hub 38 suffer a failure and break apart or come free of bearing capsule 16, forces tend to eject the turbine hub 38 (or portions thereof) aft toward exhaust nozzle assembly 22 as well as outward radially from centerline axis $C_L$. Retainer 12 acts to impede or substantially reduce the speed of aft axial movement of turbine hub 38 in the event of failure. More particularly, center body 40 and struts 42 of retainer 12 act to impede or substantially reduce the speed of aft axial movement of turbine hub 38 in the event of catastrophic failure of turbine hub 38.

Figure 2:
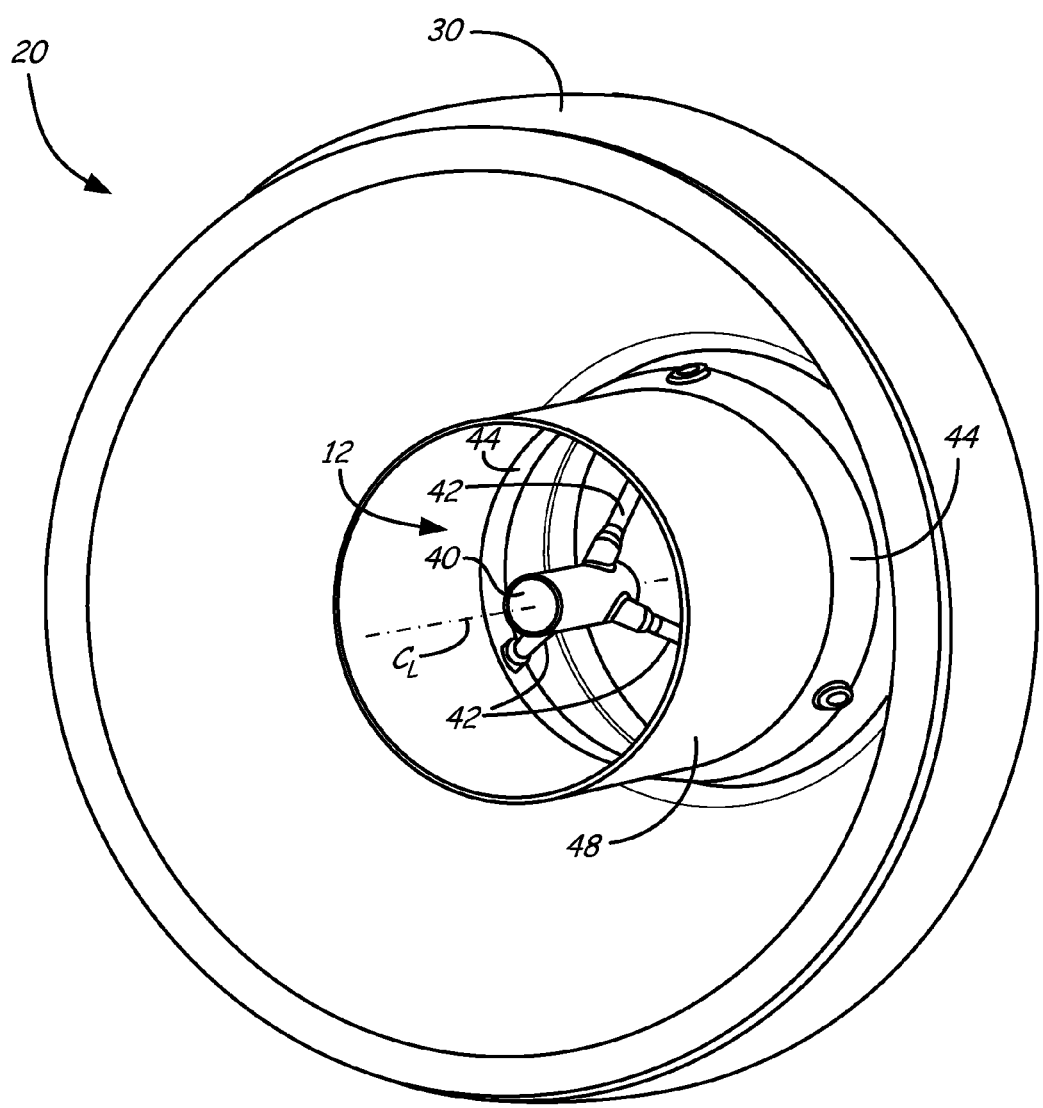
FIG. 2 is a perspective view of one example of a retainer positioned within the exhaust casing of a gas turbine engine.

FIG. 2 shows one embodiment of retainer 12 with portions of gas turbine 10 (FIG. 1) including turbine hub 38 (FIG. 1) removed so as to illustrate only combustor housing 30 of combustor assembly 20 and exhaust housing 48. In FIG. 2, retainer 12 includes aforementioned center body 40 and struts, and additionally includes a ring 44.

Retainer 12 is positioned in and connected to exhaust housing 48. Ring 44 comprises a generally conically shaped hoop with a larger diameter aft end than forward end. Ring 44 is attached to and forms a portion of exhaust housing 48 by means such as, for example, brazing, riveting, fastening, and/or welding. The inner surface of ring 44 interfaces with and forms a portion of flow path 50 of exhaust nozzle assembly 22 (FIG. 1) while the outer radial surface of ring 44 interfaces with combustor housing 30.

Outer radial ends of struts 42 extend diagonally through and connect to outer ring 44. Struts 42 are connected thereto by known means such as, for example, brazing, riveting, fastening, and/or welding. Struts 42 extend generally radially inward as well as axially forward from ring 44 with respect to centerline axis $C_L$, and connect to center body 40. Thus, center body 40 is disposed forward (upstream) of ring 44 with respect to the direction of airflow along flow path 50 (FIG. 1).

In the embodiment shown in FIG. 2, struts 42 extend rearward from center body 40 in an aerodynamic fashion away from turbine hub 38 (FIG. 1). Struts 42 are also aerodynamically shaped with thinned diameter central portions (FIGS. 3A and 3B) to reduce gas turbine engine operating losses and noise generation. Although three struts 42 are shown in FIG. 2, a varying number of struts can be used.

Figure 3A:
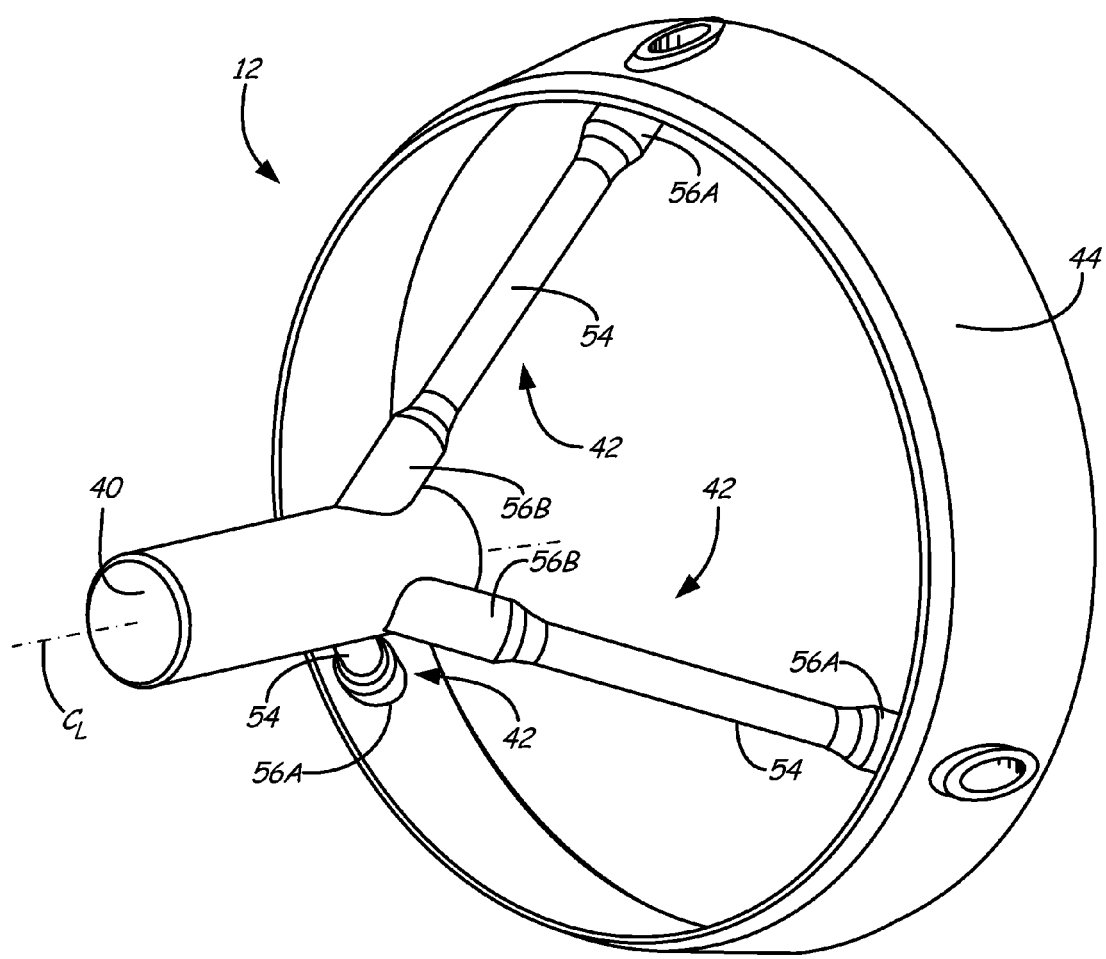
FIG. 3A is a perspective view of one example of the retainer including a center body, struts and a ring.
Figure 3B:
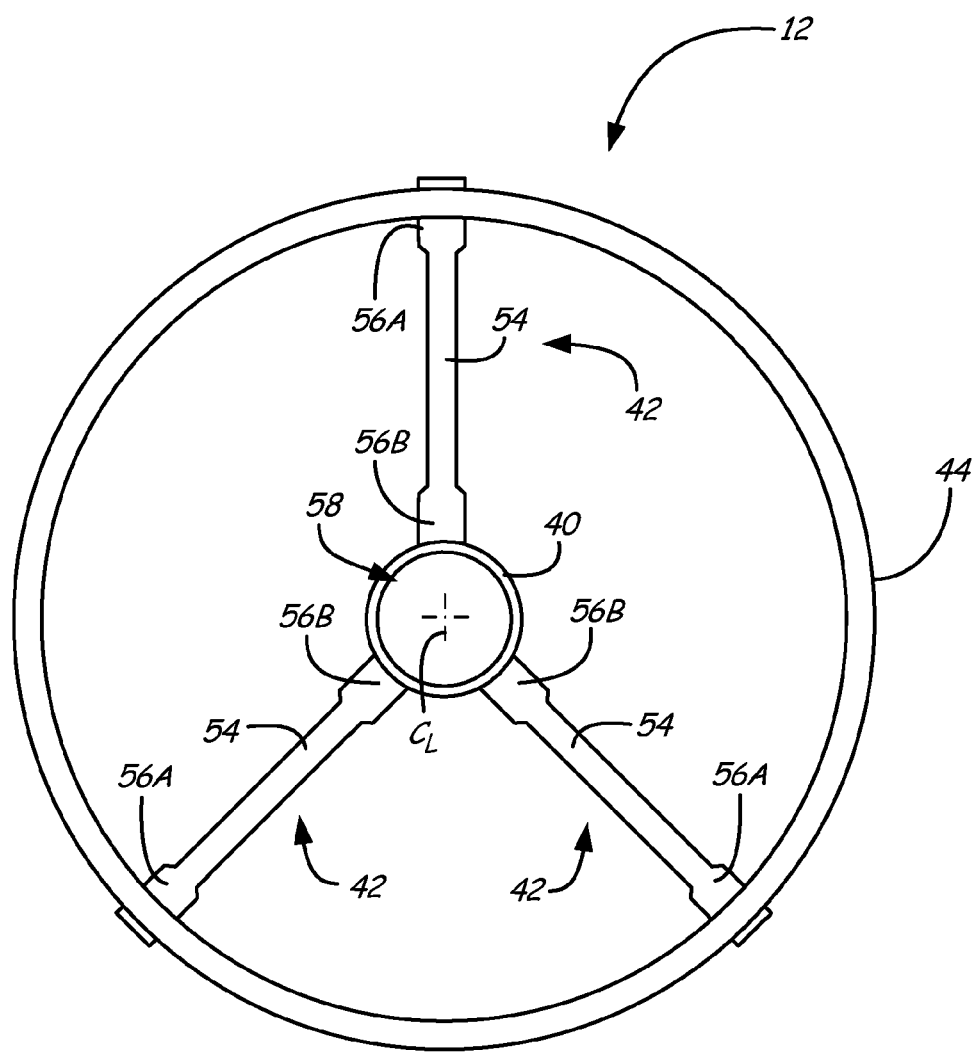
FIG. 3B is a rear view of the retainer of FIG. 3A.

FIG. 3A provides a perspective view of retainer 12. FIG. 3B is a rear view of retainer 12. Retainer 12, in particular each strut 42, includes a central portion 54, an outer radial end 56A, and an inner radial end 56B. As shown in FIG. 3B, center body 40 includes a cavity 58.

Inner radial ends 56B of struts 42 are connected to center body 42 around a periphery thereof. In the embodiment shown, center body 40 has a generally cylindrical shape and is positioned generally symmetrically about centerline axis $C_L$. As shown, center body 42 has a hollow interior cavity 58 which inner radial ends 56B of struts 42 penetrate by extending diagonally though the surface of center body 40. Cavity 58 is designed to reduce the weight of retainer 12.

As discussed previously, retainer 12 is generally conically shaped with center body 40 positioned forward of ring 44 and connected thereto by struts 42. Struts 42 extend axially and radially outward with respect to centerline axis $C_L$ from center body 40 to ring 44.

In the embodiment shown, struts 42 are shaped as rods and each has a thinned diameter central portion 54 to reduce weight. Central portion 54 extends between inner radial end 56B and outer radial end 56A. As illustrated, struts 42 can be hollow at the inner and outer radial ends 56A and 56B to reduce the weight of retainer 12. Outer radial ends 56A of struts 42 are connected to ring 44 around the circumference thereof. In the embodiment shown, outer radial ends 56A extend diagonally through ring 44.

The shape and positioning of struts 42 (extending axially away from turbine hub 38 (FIG. 1) reduces susceptibility of retainer 12 to vibratory excitation as well as reducing operating losses associated with aerodynamic drag of retainer 12. Together struts 42 as well as center body 40 give retainer 12 the ability to impede or substantially reduce the speed of aft axial movement of turbine wheel 38 (FIG. 1) in the event of failure.

The size and geometry of retainer 12 and components thereof including center body 40 and struts 42 will vary from embodiment to embodiment based upon design criteria including gas turbine engine size and the results of modal analysis.

The present disclosure describes a generally conically shaped turbine hub retainer with a ring and struts that extend inward to a center body. In a gas turbine engine, the ring is positioned radially outward of and rearward of the center body and forms a portion flow path of the gas turbine engine aft of turbine hub. In one embodiment, the struts are rod shaped with a thinned diameter that reduces weight, operating losses, and the likelihood of vibratory excitation of the retainer during operation. The addition of the retainer has minimal impact on noise and weight of the gas turbine engine while affording substantial benefits including the ability of the center body to act to impede or substantially reduce the speed of aft axial movement of the turbine hub in the event of a catastrophic failure of the turbine hub.

Discussion of Possible Embodiments

The following are non-exclusive descriptions of possible embodiments of the present invention.

A retainer for a gas turbine engine includes a center body, a plurality of struts, and a ring. The plurality of struts are connected to and extend outward from the center body. The ring is connected to the plurality of struts and is positioned aft of the center body with respect to a direction of airflow through the gas turbine engine.

The retainer of the preceding paragraph can optionally include, additionally and/or alternatively, any one or more of the following features, configurations and/or additional components.

The struts can extend both axially and radially with respect to a centerline axis of the gas turbine engine.

The struts are shaped as rods.

The struts include a thinned diameter central portion and increased diameter ends.

The struts have hollow ends.

Center body has an interior cavity.

The struts extend diagonally through the ring.

The struts extend diagonally through the center body.

The ring is conically shaped with a larger diameter at a first end than at an opposing second end.

The ring is connected to and forms a portion of an exhaust housing of the gas turbine engine.

A gas turbine engine includes a turbine hub and a generally conically shaped retainer positioned axially aft of and spaced at a distance from turbine wheel. The retainer includes a center body, a plurality of struts, and a ring. The plurality of struts are connected to and extend outward both axially and radially (with respect to a centerline axis of the gas turbine engine) from the central hub to the ring.

The gas turbine engine of the preceding paragraph can optionally include, additionally and/or alternatively, any one or more of the following features, configurations and/or additional components.

The ring is connected to and forms a portion of an exhaust housing of the gas turbine engine.

The struts are shaped as rods.

The struts include a thinned diameter central portion and increased diameter ends.

The struts have hollow ends.

The ring is conically shaped with a larger diameter at a first end than at an opposing second end.

A generally conically shaped retainer for a gas turbine engine includes a center body, a plurality of struts, and a ring. The plurality of struts are shaped as rods and are connected to and extend outward from the center body. The ring is connected to outer radial ends of the struts and is positioned aft of the center body with respect to a direction of airflow through the gas turbine engine. The ring is connected to and forms a portion of an exhaust housing of the gas turbine engine.

The retainer of the preceding paragraph can optionally include, additionally and/or alternatively, any one or more of the following features, configurations and/or additional components:

The struts include a thinned diameter central portion and increased diameter ends.

The struts have hollow ends.

The ring is conically shaped with a larger diameter at a first end than at an opposing second end.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A retainer for a gas turbine engine comprising:
    a center body;
    a plurality of struts connected to and extending outward from the center body in a downstream direction such that each strut forms an acute angle with a centerline axis of the gas turbine engine; and
    a ring connected to the plurality of struts, wherein the ring is positioned aft of the center body with respect to a direction of airflow through the gas turbine engine, wherein the ring is connected to and forms a portion of an exhaust housing of the gas turbine engine.

2. The retainer of claim 1, wherein the struts extend both axially and radially with respect to the centerline axis of the gas turbine engine.

3. The retainer of claim 1, wherein the struts are shaped as rods, each having a thinned diameter central portion concentrically disposed with respect to increased diameter ends.

4. The retainer of claim 1, wherein the struts have hollow ends and the center body has an interior cavity.

5. The retainer of claim 1, wherein the struts extend diagonally through the ring.

6. The retainer of claim 1, wherein the struts extend diagonally through the center body.

7. The retainer of claim 1, wherein the ring is conically shaped with a larger diameter at a first end than at an opposing second end.

8. The retainer of claim 1, wherein the ring is connected to the exhaust housing by at least one of brazing, riveting, fastening, and welding.

9. A gas turbine engine comprising:
    a turbine hub; and
    a generally conically shaped retainer positioned axially aft of and spaced at a distance from the turbine hub, wherein the retainer comprises:
        a center body;
        a plurality of struts connected to and extending axially downstream and radially outward from the center body such that each strut forms an acute angle with a centerline axis of the gas turbine engine, wherein each of the plurality of struts has a radially inner end joined to the center body and a radially outer end that is downstream from the radially inner end; and
        a ring connected to the plurality of struts at the radially outer ends thereof.

10. The gas turbine engine of claim 9, wherein the ring is connected to and forms a portion of an exhaust housing of the gas turbine engine.

11. The gas turbine engine of claim 9, wherein the ring is connected to the exhaust housing by at least one of brazing, riveting, fastening, and welding.

12. The gas turbine engine of claim 11, wherein the struts are shaped as rods and include a thinned diameter central portion and increased diameter ends.

13. The gas turbine engine of claim 9, wherein the struts have hollow ends.

14. The gas turbine engine of claim 9, wherein the ring is conically shaped with a larger diameter at a first end than at an opposing second end.

15. A generally conically shaped retainer for a gas turbine engine, comprising:
    a center body;
    a plurality of struts shaped as rods, each with a circular cross-section and connected to and extending outward in a downstream direction from the center body such that each strut forms an acute angle with respect to a centerline axis of the gas turbine engine; and
    a ring connected to the struts at outer radial ends thereof, wherein the ring is positioned aft of the center body with respect to a direction of airflow through the gas turbine engine, and wherein the ring is connected to and forms a portion of an exhaust housing of the gas turbine engine.

16. The retainer of claim 15, wherein each strut includes a thinned diameter central portion concentrically disposed with respect to increased diameter ends.

17. The retainer of claim 15, wherein the struts have hollow ends.

18. The retainer of claim 15, wherein the ring is conically shaped with a larger diameter at a first end than at an opposing second end.

* * * * *